United States Patent [19]

Saito

[11] Patent Number: 4,501,167

[45] Date of Patent: Feb. 26, 1985

[54] TRANSMISSION POWER OUTPUT SHAFT ASSEMBLY WITH BEARING LUBRICANT COLLECTING AND DIRECTING MEMBER

[75] Inventor: Tadashi Saito, Toyota, Japan

[73] Assignee: Toyota Jidosha Kabushiki Kaisha, Toyota, Japan

[21] Appl. No.: 425,259

[22] Filed: Sep. 28, 1982

[30] Foreign Application Priority Data

May 18, 1982 [JP] Japan ................... 57-84624

[51] Int. Cl.³ ............... F16H 57/04; F16H 57/02; F01M 9/00
[52] U.S. Cl. .................. 74/467; 74/606 R; 184/6.12
[58] Field of Search ............. 74/467, 606 R; 184/6.12

[56] References Cited

U.S. PATENT DOCUMENTS

| 1,150,777 | 8/1915 | Leavitt | 74/467 |
| 1,533,641 | 4/1925 | Fekete et al. | 74/467 |
| 2,049,234 | 7/1936 | Thomas et al. | 74/467 |
| 3,785,458 | 1/1974 | Caldwell et al. | 184/6.12 |
| 4,287,783 | 9/1981 | Ida et al. | 74/467 |
| 4,347,756 | 9/1982 | Sogo | 74/467 |
| 4,368,802 | 1/1983 | Grabill et al. | 74/467 |

FOREIGN PATENT DOCUMENTS

| 0140964 | 8/1982 | Japan | 74/467 |
| 2019962 | 10/1979 | United Kingdom | 74/467 |
| 2041117 | 9/1980 | United Kingdom | |

Primary Examiner—Lawrence J. Staab
Assistant Examiner—Michael D. Bednarek
Attorney, Agent, or Firm—Stevens, Davis, Miller & Mosher

[57] ABSTRACT

In a transmission including a transmission casing, a rotational speed changing mechanism, and a differential mechanism which has a differential power input gear, a power output shaft transmits the rotary power output of the rotational speed changing mechanism to the differential mechanism via a power output gear provided at its one end and meshing with the differential power input gear. This power output shaft is formed with a first lubricant passage extending from its one end opening at the one end of the power output shaft to the other end opening to a point on its side surface. A bearing rotatably supports a part of the power output shaft proximate to the power output gear from the transmission casing. This bearing is located close to the above-mentioned point on the side surface of the power output shaft. A lubricant collecting and directing member, provided as mounted to the transmission casing, includes an extension portion which extends into that one end of the abovementioned first lubricant passage from its open end, a collection portion for collecting lubricant stirred up by the differential power input gear, and a second lubricant passage which communicates the collection portion with the extension portion. The lubricant collected by the collection portion is thus supplied to the first lubricant passage and then to the bearing.

3 Claims, 4 Drawing Figures

TRANSMISSION POWER OUTPUT SHAFT ASSEMBLY WITH BEARING LUBRICANT COLLECTING AND DIRECTING MEMBER

BACKGROUND OF THE INVENTION

The present invention relates to a transmission power output shaft assembly, and more particularly relates to a transmission power output shaft assembly which provides good and assured lubrication for a bearing which supports the end of a transmission power output shaft proximate to a power output gear wheel thereof.

Nowadays the front engine front wheel drive type of automotive vehicle configuration, or the so called FF configuration, is becoming more and more popular. Further, automatic transmissions for such front engine front wheel drive automotive vehicles are undergoing much development. One form of such an automatic transmission for a front engine front wheel drive automotive vehicle which has been conceived of, and constructed, incorporates a fluid torque converter and a gear transmission mechanism arranged in line, and a power output shaft arranged under this in line assembly of the fluid torque converter and the gear transmission mechanism to extend in parallel to the general axis of said assembly, with its end remote from the fluid torque converter rotationally driven by a power output member of the gear transmission mechanism, and with its other end close to the fluid torque converter being provided with a power output gear which is meshed with a power input gear wheel of a differential mechanism. This constructional arrangement is widely accepted because of its compactness and convenience, especially in the case of a transversely mounted engine/transmission assembly; and it is very helpful from the point of view of minimizing the axial length of the vehicle transmission as a whole.

In such a construction, the power output shaft must of course be supported from the casing of the transmission via bearings such as roller bearings or the like. Now, the power output shaft support bearing on the end of the power output shaft to which is fitted the power output gear wheel is typically fitted just inboard of said power output gear wheel, i.e. on the side of said power output gear wheel remote from the end of the power output shaft. Thus, this support bearing comes to be sandwiched between the power output gear wheel and (typically) a bearing holder which is mounted to the transmission casing and holds the support bearing. In this connection, the question arises as to how proper lubrication is to be provided for this support bearing. Because typically the power output gear wheel mounted as explained above on the end of the power output shaft closer to the fluid torque converter is closely surrounded, by a part of the transmission casing, good access to the aforesaid support bearing mounted just inboard of this power output gear wheel is not available past this power output gear wheel, and accordingly splash lubrication from within the part of the transmission casing that encloses the transmission power output gear wheel and the differential power input gear meshed therewith cannot be relied upon the lubricating this support bearing, in view of such limited access available thereto.

Accordingly, it might be conceived of to provide a lubricant passage within the power output shaft, with one end thereof opening at its end at which the power output gear wheel is fitted, and with the other end thereof opening in the vicinity of the support bearing. Thus lubricant from within the part of the transmission casing that encloses the transmission power output gear wheel and the differential power input gear meshed therewith which is splashed around by said differential power input gear so as to impinge upon said end of the power output shaft would be able to enter into this lubricant passage so as to pass therethrough to be supplied to the support bearing. Therefore passage of lubricant past the power output gear wheel, between its outer peripheral surface and the inner confronting surface of the transmission casing, would not be relied upon for supply of lubricant to the support bearing.

This form of construction would provide better lubrication for the support bearing than a construction incorporating no lubrication passage at all. However, the difficulty would arise with this form of construction that the lubricant provided within the part of the transmission casing that encloses the transmission power output gear wheel and the differential power input gear meshed therewith, which lies as a matter of course at the bottom portion of said part of said transmission casing, and which is thus splashed around by said differential power input gear (by a lower part of the periphery of said differential power input gear passing through said lubricant and by adhering of said lubricant thereon for a time) so as to impinge upon said end of the power output shaft, is necessarily moving at quite a high speed, particularly when the vehicle incorporating this transmission is being operated in the high road speed operational region. Accordingly, particularly in this high vehicle road speed operational region, it would be difficult for this splashed around lubricant to enter into the lubricant passage in the power output shaft, owing to the velocity of this lubricant, and thus the problem of adequate lubrication of the support bearing of the power output shaft would not be adequately resolved.

SUMMARY OF THE INVENTION

Accordingly, it is the primary object of the present invention to provide a transmission power output shaft assembly of the general sort detailed above, which provides good, adequate, and reliable lubrication for such a power output shaft support bearing.

It is a further object of the present invention to provide such a transmission power output shaft assembly, which also provides good, adequate, and reliable cooling for such a power output shaft support bearing.

It is a further object of the present invention to provide such a transmission power output shaft assembly, which provides good and reliable lubrication and cooling for said support bearing, even when the vehicle incorporating the transmission is operated for a long time at a high vehicle road speed.

It is a further object of the present invention to provide such a transmission power output shaft assembly, which does not require any extra moving parts for thus ensuring good and reliable lubrication and cooling for said support bearing.

It is a further object of the present invention to provide such a transmission power output shaft assembly, with good lubricant supply for such a support bearing, wherein the provision of this lubricant supply is reliable.

It is a further object of the present invention to provide such a transmission power output shaft assembly, with good lubricant supply for such a support bearing, in which the axial length of the transmission is minimized.

It is a further object of the present invention to provide such a transmission power output shaft assembly, with good lubricant supply for such a support bearing, in which the transmission is not made unduly complicated.

It is a further object of the present invention to provide such a transmission power output shaft assembly, with good lubricant supply for such a support bearing, in which the suitability of the transmission for incorporation into a front engine front wheel drive automotive vehicle is maximized.

It is a further object of the present invention to provide such a transmission power output shaft assembly, with good lubricant supply for such a support bearing, in which the suitability of the transmission for incorporation into a front transversely mounted engine front wheel drive automotive vehicle is maximized.

It is a further object of the present invention to provide such a transmission power output shaft assembly, in which premature failure of the transmission as a whole is guarded against.

According to the present invention, these and other objects are accomplished by a power output shaft assembly for a transmission comprising a transmission casing, a rotational speed changing mechanism, and a differential mechanism comprising a differential power input gear, comprising: (a) a power output shaft for receiving and outputting the rotary power output of said rotational speed changing mechanism, said power output shaft being formed with a first lubricant passage one end of which opens to one end of said power output shaft and the other end of which opens to a point on the side surface of said power output shaft; (b) a power output gear at said one end of said power output shaft; (c) a bearing for rotatably mounting said power output shaft to said transmission casing, said bearing being located close to said point on said side surface of said power output shaft and supporting a part of said power output shaft proximate to said power output gear; and (d) a lubricant collecting and directing member, mounted to said transmission casing, comprising an extension portion which extends into said one end of said first lubricant passage formed in said power output shaft and a collection portion for collecting lubricant stirred up by said differential power input gear, said collection portion of said lubricant collecting and directing member being communicated to said extension portion thereof by a second lubricant passage formed in said lubricant collecting and directing member the end of which formed in said extension portion opens to said first lubricant passage in said power output shaft.

According to such a structure, since the lubricant thus stirred up by said differential power input gear enters into said collection portion of said lubricant collecting and directing member, to pass into said second lubricant passage and to be supplied therethrough from said extension portion of said lubricant collecting and directing member to said first lubricant passage formed in said power output shaft, therefore no problem arises of inadequate lubricant supply into said first lubricant passage, and proper supply of lubricant for lubricating and for cooling said bearing is available. It should be noted that this effect has been produced, according to the present invention, without any extra moving parts being added to the construction, since the aforesaid lubricant collecting and directing member is a static member, fixed to the transmission casing.

Further, according to a particular aspect of the present invention, these and other objects are more particularly and concretely accomplished by such a transmission power output shaft assembly as described above, wherein said bearing is a tapered roller bearing, the radially smaller side of said bearing facing towards said other end of said first lubricant passage.

According to such a structure, the pump effect produced by this construction and orientation of said bearing will aid in the positive and effective flow of lubricant through said bearing, so as to lubricate and cool said bearing reliably and effectively.

Further, according to a particular aspect of the present invention, these and other objects are more particularly and concretely accomplished by a transmission power output shaft assembly of either of the two sorts described above, wherein said collection portion of said lubricant collecting and directing member is formed with an opening opposed from below to an inner surface portion of said transmission casing for collecting lubricant splashed from or receiving flow of lubricant flowing theredown after having being splashed thereon from a peripheral part of said differential power input gear after being adhered to said peripheral part of said differential power input gear after passage of said peripheral part of said differential power input gear through a bath of lubricant retained in the transmission casing.

According to such a structure, the direct splashed or the steady flow of lubricant directed positively down said inner surface portion of said transmission casing is received into said opening to be supplied into said first lubricant passage, so as to lubricate and cool said bearing reliably and effectively.

Further, according to a particular aspect of the present invention, these and other objects are more particularly and concretely accomplished by a transmission power output shaft assembly of the sort proximately described above, wherein said opening is opposed from below to an angled portion of said inner surface portion of said transmission casing.

According to such a structure, since the flow of lubricant down said inner surface portion of said transmission casing will naturally be concentrated along such an angled portion, this flow of lubricant into said opening to be supplied into said first lubricant passage, so as to lubricate and cool said bearing reliably and effectively, will be still more ample and voluminous.

BRIEF DESCRIPTION OF THE DRAWINGS

The present invention will now be shown and described with reference to a preferred embodiment thereof, and with reference to the illustrative drawings. It should be clearly understood, however, that the description of the embodiment, and the drawings, are all of them given purely for the purposes of explanation and exemplification only, and are none of them intended to be limitative of the scope of the present invention in any way, since the scope of the present invention is to be defined solely by the legitimate and proper scope of the appended claims. In the drawings:

DESCRIPTION OF THE PREFERRED EMBODIMENT

Figure 1:
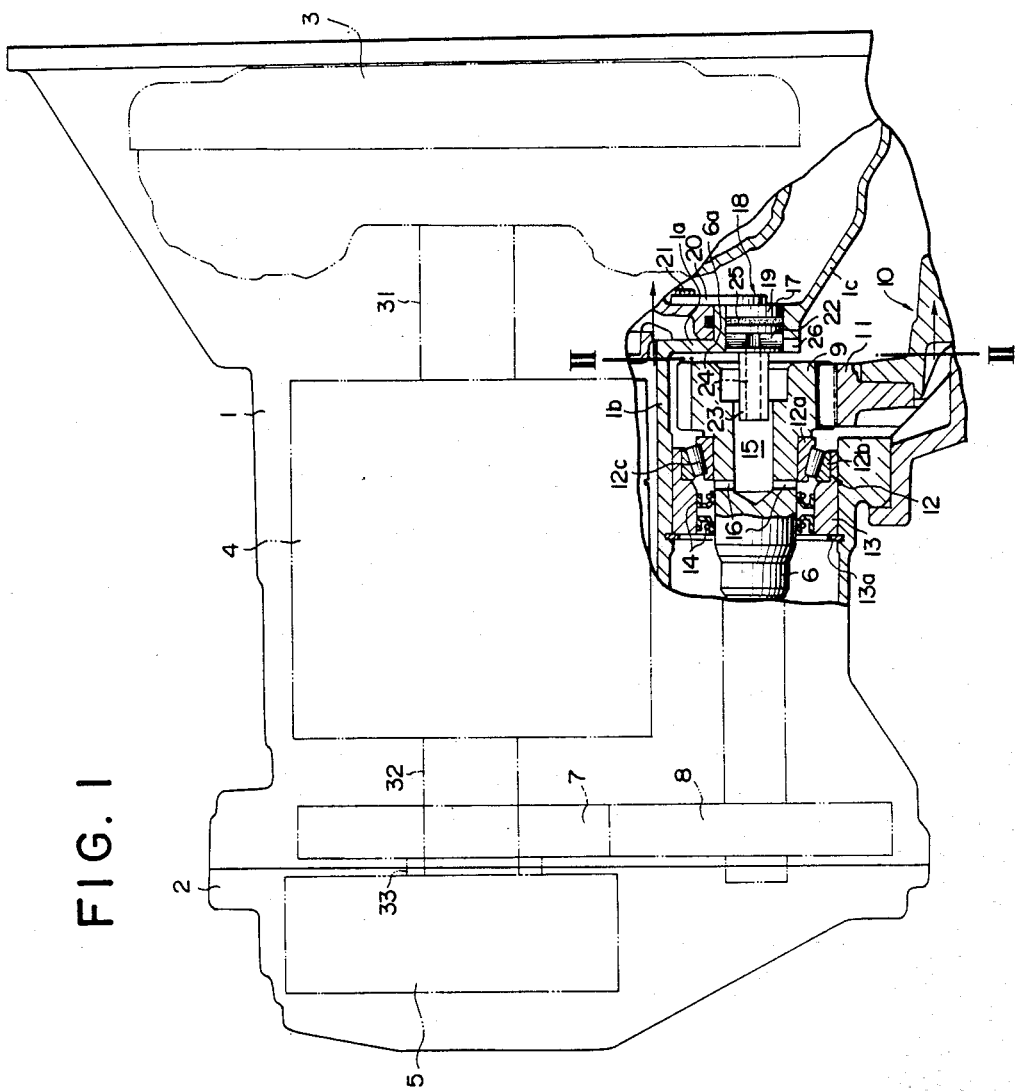
FIG. 1 is a sectional view taken through an automatic transmission incorporating a fluid torque converter, a gear transmission mechanism, and an overdrive mechanism, said automatic transmission being suitable for use in an automobile of front engine front wheel drive or so called FF configuration, and through part of a differential device associated with said automatic transmission; the general plane of the main schematically shown part of this sectional view being vertical, but the plane of a more detailed portion of this sectional view which is shown as a cutaway being a horizontal plane.

The present invention will now be described with reference to a preferred embodiment thereof, and with reference to the appended drawings. FIG. 1 is a sectional view taken along a generally vertical plane through an automatic transmission, formed with a transmission casing 1 and with an end cover 2 secured to the left hand side in the figure of the transmission casing 1. This automatic transmission incorporates a fluid torque converter 3, a gear transmission mechanism 4, and an overdrive mechanism 5, all of per se well known sorts, which are arranged in the specified order in rotary power transmission relationship from the right to the left of the figure.

That is, rotary power is provided by an engine such as an internal combustion engine of a vehicle, not shown in the figures, and is inputted to the right hand or input side in the figure of the torque converter 3 by a shaft which is also not shown. The torque converter 3 performs a per se well known function of torque conversion of this rotary power (also acting, when so required, as a fluid clutch) and then transmits rotary power from its left hand or output side in the figure, via an intermediate shaft 31 to the right hand or input side of the gear transmission mechanism 4. In this gear transmission mechanism 4, the rotational speed of this rotary power is optionally altered in a per se well known way, according to the current values of various operational parameters which represent operational conditions of the vehicle incorporating the shown transmission system, and then the gear transmission mechanism 4 outputs this rotary power from its left hand or output side in the figure, via an intermediate shaft 32 to the right hand or input side of the overdrive mechanism 5. In this overdrive mechanism 5, the rotational speed of this rotary power is optionally altered in a per se well known way, according to the current values of various operational parameters which represent operational conditions of the vehicle incorporating the shown transmission system, and then the overdrive mechanism 5 outputs this rotary power, again from its right hand side in the figure, which is also its output side, to an overdrive mechanism power output gear wheel 7, via an intermediate shaft 33.

Parallel to this arrangement of the torque converter 3, the gear transmission mechanism 4, and the overdrive mechanism 5, parallel to the axial direction of various shafts such as the shafts 31, 33, and 33, and below them as seen in FIG. 1 and generally as seen in the actual mounting of this transmission in a vehicle, there is provided a power output shaft 6. This power output shaft 6 is in fact provided in order to lead the power output by the transmission described above from the point at which it is available, which is in fact the overdrive mechanism power output gear wheel 7 which is located to the left of the figure to a point located to the right of the figure, near the torque converter 3, as will become clear later; and this transferring of the output point of rotational power from the automatic transmission system to a point near and somewhat below the torque converter 3 is desirable from the point of view of the overall configuration of the engine/transmission system of a front transversely mounted engine front wheel drive vehicle or a so called FF vehicle, as is per se well known to those skilled in the relevant art. On the left hand end in the figure of the power output shaft 6 there is fixedly mounted a power output shaft driven gear wheel 8, which is always in mesh with the aforesaid overdrive mechanism power output gear wheel 7. Accordingly, the power output shaft 6 is supplied with the output rotational power of the transmission mechanism described above.

A part of FIG. 1 is shown as a more detailed non schematic sectional view, in the form of a cutaway. In fact, the plane along which this portion of the section of FIG. 1 is taken is a horizontal plane, as will be explained in more detail later, and thus is perpendicular to the general plane of the major schematic portion of FIG. 1. The arrangements at the right hand end in the figure of the power output shaft 6 are more particularly shown, in this part of FIG. 1. The plane of this part of FIG. 1 contains the central axis of the power output shaft 6.

On this right hand end in the figure of the power output shaft 6 there is integrally formed a transmission power output gear wheel 9, which is thus shown in axial cross section in said cutaway portion of FIG. 1. A differential device 10 is provided for receiving the output power from the transmission, and in fact this differential device 10 is located somewhat below the main body of the transmission and in the direction towards the viewer of FIG. 1 therefrom, as will become more apparent from a discussion of FIG. 2 hereinafter. This differential device 10 incorporates a power input ring gear 11, which is in constant mesh with the aforesaid transmission power output gear wheel 9 on the right hand end in the figure of the power output shaft 6, which is driven by said power output gear wheel 9, and which drives the differential device 10.

Figure 2:
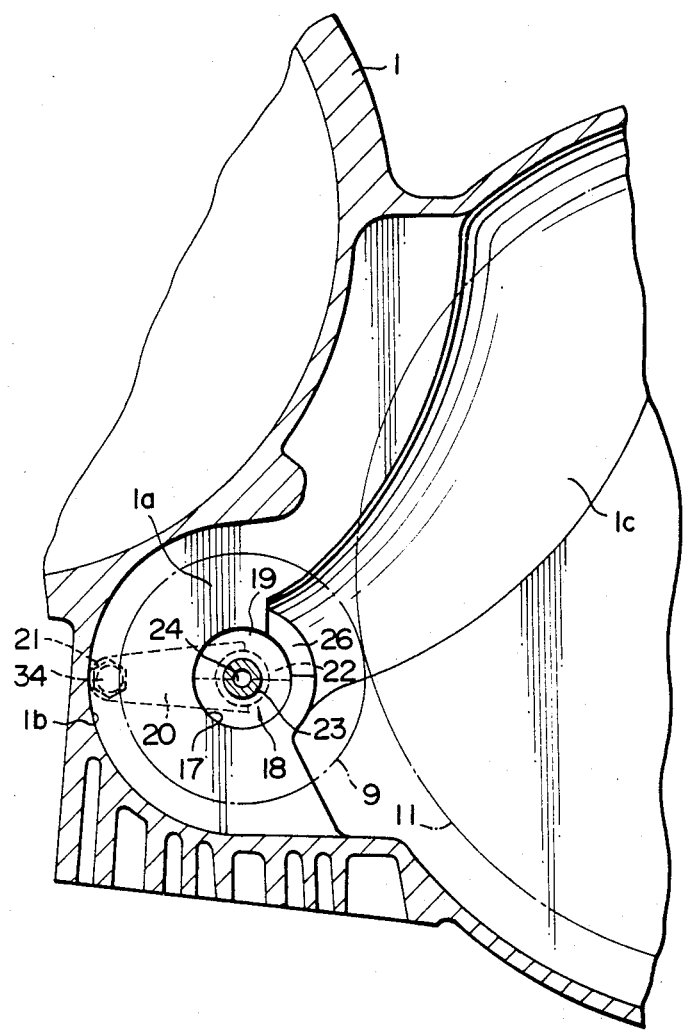
FIG. 2 is a vertical part sectional part elevational view through the transmission portions shown in FIG. 1, taken along a plane indicated by the line II—II in FIG. 1 and looking in the direction of the arrows.

In FIG. 2, there is shown a vertical part sectional part elevational view through the transmission portions shown in FIG. 1, taken along a plane indicated by the line II—II in FIG. 1 and as viewed looking in the direction of the arrows. By inspection of FIGS. 1 and 2, it will be seen that in the shown transmission construction: the right hand face as seen in FIG. 1 of the transmission power output gear wheel 9 in fact also defines the end surface of the power output shaft 6; a part 1a of the transmission casing 1 extends sideways from the main body of said transmission casing 1 generally parallel to and very close to said end surface of said power output shaft 6 (i.e. the end face of said transmission power output gear wheel 9); an outer portion 1b of said transmission casing 1 extends from said main body of said transmission casing 1 and surrounds a substantial part of the peripheral surface of said transmission power output gear wheel 9 with a small gap being left therebetween; and a major portion 1c of said transmission casing 1 extends to the right in FIG. 1 from the vicinity of said part 1a of said transmission casing 1, said major portion 1c of the transmission casing 1 separating the upper space to the right of FIG. 1 within which the torque converter 3 is mounted from the lower space to the right of FIG. 1 within which the differential device 10 is mounted.

The power output shaft 6 is rotatably supported in the transmission casing 1 at several points along its axial extent, of course; only the support arrangement at the right hand end in FIG. 1 of the power output shaft 6, i.e. at the end thereof at which is formed the transmisson power output gear wheel 9, is shown in the figures. In detail, over the outer peripheral surface of the power output shaft 6 there is closely fitted an inner race 12a of a taper roller bearing 12, and the right hand face in FIG. 1 of this inner race 12a is abutted against the left hand face in FIG. 1 of the transmission power output gear wheel 9. The outer race 12b of this taper roller bearing 12 is fitted within a bearing support member 13, which is fitted into an aperture formed in the transmission casing 1 and is retained therein by a circlip 13a. Between the inner race 12a and the outer race 12b of this taper roller bearing 12 there are fitted a plurality of rollers 12c thereof. And, finally, between said bearing support member 13 and a part of the outer periphery of the power output shaft 6 which is on the side of the taper roller bearing 12 away from the transmission power output gear wheel 9, i.e. on the left hand side of said taper roller bearing 12 in FIG. 1, there is provided a lubricant seal construction 14, in order to retain lubricant within the portion of the transmission casing 1 which houses the gear transmission mechanism 4 and the overdrive mechanism 5 and to prevent such lubricant escaping to flow downwards to a lower part of the transmission casing 1, i.e. the part of said transmission casing 1 which houses the differential mechanism 10, for example.

Particularly according to a particular aspect of the transmission power output shaft assembly according to the present invention, the bearing 12 is provided as a tapered roller bearing, and the rollers thereof angle outwards in the direction of the transmission power output gear wheel 9; in other words, the distance from the end of each of said rollers which is closer to said transmission power output gear wheel 9 to the central axis of the power output shaft 6 is larger than the distance from the other end of said one of said rollers which is farther from said transmission power output gear wheel 9 to said central axis of said power output shaft 6. The operational significance of this constructional feature will be explained later.

Now the arrangements for providing lubrication for the tapered roller bearing 12 will be explained. In this connection, it should be understood that the provision of good and adequate lubrication for the tapered roller bearing 12 is of very great importance, since said tapered roller bearing 12 supports the power output shaft 6 which transmits the entire rotational power output by the engine (not shown) of the vehicle to which the shown transmission is fitted, and hence the load which is required to be sustained by said tapered roller bearing 12 is very considerable.

An axial hole 15 is provided as extending along the power output shaft 6 from its right hand end in the figure to an intermediate point therealong which is farther away from the transmission power output gear wheel 9 than is said tapered roller bearing 12, i.e. to an intermediate point therealong which is on the other side of said tapered roller bearing 12 from said transmission power output gear wheel 9. From this intermediate point, i.e. from approximately the bottom of this axial hole 15, there are formed a plurality of radially extending and circumferentially spaced passages 16 which communicate said bottom of said axial hole 15 to corresponding circumferentially spaced points on the outer periphery of said power output shaft 6, said points on said outer periphery of said power output shaft 6 being axially located therealong between said lubricant seal construction 14 and said tapered roller bearing 12, on the radially smaller side of said tapered roller bearing 12. Thus, lubricant which passes from the space generally containing the differential mechanism 10, etc. enters the right hand end in the figure of the axial hole 15 in the power output shaft 6 and is able to pass along said axial hole 15 in the leftwards direction in the figure to its bottom, whence said lubricant is urged by the centrifugal force due to the rotation of the power output shaft 6 in radially outward directions through the radially extending passages 16 to be introduced into the space between the lubricant seal 14 and the tapered roller bearing 12, whence this lubricant passes through the interstices between the rollers 12c of the tapered roller bearing 12 to the space to the right in the figure of said tapered roller bearing 12—lubricating said tapered roller bearing 12 as it proceeds—from which space said lubricant escapes again to the space generally containing the differential mechanism 10, etc.

However, because of the above described proximity of said part 1a of said transmission casing 1 to said end face of said transmission power output gear wheel 9, i.e. to the open right hand end in the figure of said axial hole 15 in said power output shaft 6, and because of the above described proximity of said part 1b of said transmission casing 1 to said peripheral surface of said transmission power output gear wheel 9, therefore, sufficient quantities of lubricant cannot be relied upon to enter said open right hand end in the figure of said axial hole 15 in said power output shaft 6 to lubricate the tapered roller bearing 12, without the provision of some form of lubricant channeling construction; and this problem has been explained above in the section of this specification entitled "BACKGROUND OF THE INVENTION". Such inadequacy of lubrication cannot be tolerated, in view of the importance of durability of the support bearing 12, and of the transmission system as a whole. Thus, in the shown transmission which incorporates the preferred embodiment of the transmission power output shaft assembly according to the present invention, there is provided such a lubricant channeling construction for positively directing lubricant into said open right hand end in the figure of said axial hole 15 in said power output shaft 6, and the details thereof will now be described.

Through the part 1a of the transmission casing 1 which opposes the right hand side in the figure of the transmission power output gear wheel 9 there is formed a cylindrical hole 17, the central axis of which substantially coincides with the central axis of the power output shaft 6 and of the transmission power output gear wheel 9. In this cylindrical hole 17 there is snugly fitted a mounting base 19 of a lubricant collecting and directing member 18, so that the lubricant collecting and directing member 18 is supported in position by this portion 1a of the transmission casing 1. The lubricant collecting and directing member 18 may be seen in detailed perspective view in FIG. 4, which shows it by itself as removed from the cylindrical hole 17; and the configuration of the lubricant collecting and directing member 18 as it is fitted in the cylindrical hole 17 may be seen in detail in perspective view in FIG. 3, which shows the lubricant collecting and directing member 18, the portion 1a of the transmission casing 1 in which said lubricant collecting and directing member 18 is mounted via the cylindrical hole 17, and a relevant part of the portion 1c of the transmission casing 1 which contains the fluid torque converter 3.

In detail, the mounting base 19 of the lubricant collecting and directing member 18 is formed as a cylinder of radius approximately equal to the radius of the cylindrical hole 17, with an axially intermediate semicircular sector portion 22 thereof cut away. From one end (the left hand end in FIG. 1) of the mounting base 19 of the lubricant collecting and directing member 18 there protrudes a cylindrical extension portion 23, which is coaxial with the mounting base 19; and this cylindrical extension 23 and the portion of the mounting base 19 between this cylindrical extension 23 and the cutaway 22 are both pierced with an axial hole 24. Accordingly, the axial hole 24 provides a lubricant path between the cutaway 22 and the end of the cylindrical extension 23 remote from the mounting base 19 of the lubricant collecting and directing member 18. To the other end portion 35 of the lubricant collecting and directing member 18, remote from the cylindrical extension 23, there is mounted one end or root end of a radially extending fixing arm 20, the other end or tip end of which is pierced with a circular hole 34. Around the cylindrical peripheral surface of the part of the mounting base 19 between the cutaway 22 and the end portion 35 there is fitted an annular sealing O-ring 25, which in fact may be mounted in a circumferential groove formed in said peripheral surface. An opening 36 is formed in the end portion 35 to reduce the weight of the lubricant collecting and directing member 18 and is not in communication with the cutaway 22.

The lubricant collecting and directing member 18 is fitted in the cylindrical hole 17 in the following way. The outer cylindrical peripheral surface of the mounting base 19 of the lubricant collecting and directing member 18 is snugly fitted in the cylindrical hole 17, with the O-ring 25 forming a lubricant tight seal therebetween, and with the side of the fixing arm 20 towards the mounting base 19 resting against the side of the portion 1a of the transmission casing 1 remote from the power output shaft 6. A bolt 21 is passed through the aforesaid circular hole 34 formed in the end of the fixing arm 20 remote from the mounting base 19 and is secured into a corresponding screw hole formed in the portion 1a of the transmission casing 1, so as securely to fix the lubricant collecting and directing member 18 as fitted in the cylindrical hole 17 in a particular axial position and in a particular rotational orientation. The axial position in which the lubricant collecting and directing member 18 is thus fixed in the cylindrical hole 17 is such that, as may be seen in FIG. 1, the cylindrical extension 23 of the lubricant collecting and directing member 18 extends well into the axial hole 15 in the power output shaft 6, and the rotational orientation in which the lubricant collecting and directing member 18 is thus fixed in the cylindrical hole 17 is such that, as may be seen in FIG. 2, the cutaway 22 faces in the upwards direction, with relation to the position in which this transmission is intended to be mounted in an automotive vehicle.

Figure 3:
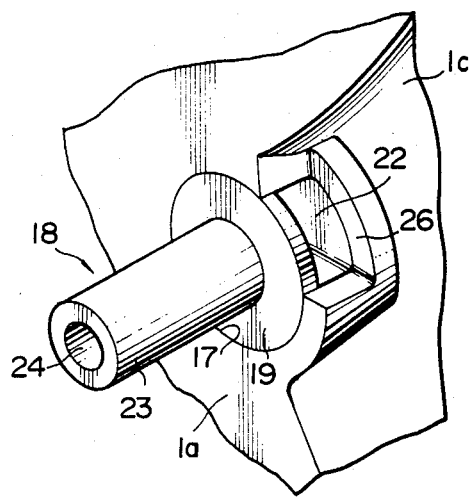
FIG. 3 is a perspective view of a part of the casing of the automatic transmission shown in FIGS. 1 and 2 which encloses the aforesaid fluid torque converter, and of a lubricant collection and direction member which is fitted into a hole formed in said part of said casing.
Figure 4:
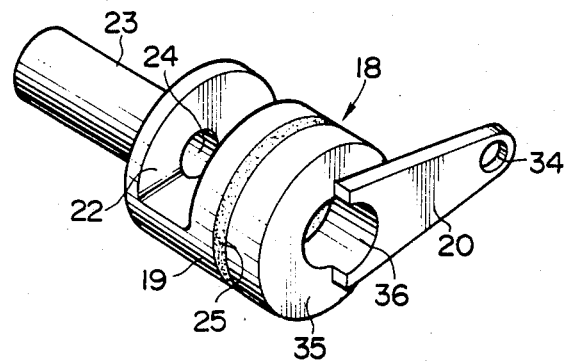
FIG. 4 is a perspective view of said lubricant collection and direction member by itself.

As may be understood from FIG. 1 and FIG. 2, the portion 1c of the transmission casing 1 which houses the fluid torque converter 3 is formed generally as a cone, to the side of which is provided the differential device 10. Now, as is best seen in FIG. 3, on the angle where this torque converter housing portion 1c meets the internal partition wall 1a in which is fitted the lubricant collecting and directing member 18 there is formed a cutaway portion 26, which thus provides lubricant access from the outer surface of the torque converter housing portion 1c (i.e. the surface thereof which defines the space within which the differential mechanism 10 is housed) to the cutaway 22 cut into the mounting base 19 of the lubricant collecting and directing member 18.

When the automotive vehicle incorporating this transmission is running, so that rotary power which is produced by the engine thereof is transmitted through the fluid torque converter 3, the gear transmission mechanism 4, and the overdrive mechanism 5, to be then transmitted to the power output shaft 6 via the gear wheels 7 and 8, and then further to the transmission power output gear 9 and the differential ring gear 11, both rotating continuously in mesh with one another, since the lower part (not shown) of the housing which contains the differential device 10 as a matter of course is partly filled with lubricating fluid such as oil, this lubricating fluid is therefore churned up by the turning of the differential ring gear 11, the lower part of which passes through said lubricating fluid. Thus, quantities of this lubricant are continually being carried up on the sides and on the teeth of this differential ring gear 11 to the upper parts thereof, and some of this lubricant of course then is splashed off in this vicinity so as to impinge against the lower part of the outer side of the torque converter housing portion 1c of the transmission housing 1, i.e. on the part of said outer side of said torque converter housing portion 1c particularly designated by the reference symbol 1c in FIGS. 2 and 3. This splashed off lubricant then flows down this outer side of the torque converter housing portion 1c, and particularly is concentrated so as to flow down along the angle where this torque converter housing portion 1c meets the internal partition wall 1a in which is fitted the lubricant collecting and directing member 18. Thus this flowing down lubricant is directed to flow over and through the cutaway portion 26, and thus is directed into the cutaway 22 cut into the mounting base 19 of the lubricant collecting and directing member 18, and from this cutaway 22 is directed into the axial hole 24 through the cylindrical extension 23 of the lubricant collecting and directing member 18, which thus directs this lubricant flow into the axial hole 15 in the power output shaft 6. From this axial hole 15, as explained earlier, this lubricant flow passes along said axial hole 15 in the leftwards direction in the figure to its bottom, whence said lubricant is urged by the centrifugal force due to the rotation of the power output shaft 6 in radially outward directions through the radially extending passages 16 to be introduced into the space between the lubricant seal 14 and the tapered roller bearing 12, whence this lubricant passes through the interstices between the rollers 12c of the tapered roller bearing 12 to the space to the right in the figure of said tapered roller bearing 12, lubricating said tapered roller bearing 12 as it proceeds, and from which space said lubricant escapes again to the space generally containing the differential mechanism 10, etc.

It should be understood particularly that, according to a particular feature of the shown construction, this flow of lubricant is aided and expedited by the fact that the roller bearing 12 is a tapered roller bearing, the rollers thereof being angled outwards in the direction of the transmission power output gear wheel 9; this construction provides a pumping action which urges the lubricant in the rightwards direction as seen in FIG. 1, towards the power output gear wheel 9. Further, in the shown construction which is the preferred embodiment of the transmission power output shaft assembly according to the present invention, there are provided no extra moving parts; the lubricant collecting and directing member 18 is a stationary part mounted fixedly to the transmission casing 1, and accordingly no particular problem of durability thereof will be likely to occur. Accordingly, good lubrication for the tapered roller bearing 12 for supporting the power output shaft 6 of the transmission is ensured, thus maximizing the durability of said roller bearing 12 and thus of the transmission system as a whole. This end has been achieved without making the transmission very much more complicated, and without increasing its axial length; and thus the suitability of the transmission for installation in a front transversely mounted engine front wheel drive automotive vehicle has been preserved.

Although the present invention has been shown and described with reference to a preferred embodiment thereof, and in terms of the illustrative drawings, it should not be considered as limited thereby. Various possible modifications, omissions, and alterations could be conceived of by one skilled in the art to the form and the content of any particular embodiment, without departing from the scope of the present invention. Therefore it is desired that the scope of the present invention, and of the protection sought to be granted by Letters Patent, should be defined not by any of the perhaps purely fortuitous details of the shown embodiment, or of the drawings, but solely by the scope of the appended claims, which follow.

What is claimed is:

1. A power output shaft assembly for a transmission comprising a transmission casing, a rotational speed changing mechanism, and a differential mechanism comprising a differential power input gear, said transmission casing including a casing portion which forms a partition for separating a space for housing said differential mechanism from a space for housing said rotational speed change mechanism except a cylindrical hole bored therethrough, comprising:
    a power output shaft for receiving and outputting rotary power output of said rotational speed changing mechanism, said power output shaft being formed with a first lubricant passage one end of which opens to one end of said power output shaft and the other end of which opens to a point on a side surface of said power output shaft;
    a power output gear at said one end of said power output shaft, said one end of said power output shaft and an axial end surface of said power output gear on the side of said one end of said power output shaft being positioned closely to oppose a part of said casing wall portion forming said partition;
    a bearing for rotatably mounting said power output shaft to said transmission casing, said bearing being located close to the other axial end surface of said power output gear and supporting part of said power output shaft proximate to said power output gear; and
    a lubricant collecting and directing member mounted to said part of said casing portion forming said partition, comprising a cylindrical base portion adapted to be fitted into said cylindrical hole of said casing portion forming said partition and a tubular extension which extends from said cylindrical base portion into said one end of said first lubricant passage formed in said power output shaft, said cylindrical base portion being formed with a partial cutaway communicated with an end of a passage in said tubular extension;
    wherein a surface of said casing portion forming said partition which defines said space for housing said differential mechanism is formed with a cutaway portion which at least partially aligns with said cutaway formed in said base portion of said lubricant collecting and directing member and adapted to collect lubricant stirred up by said differential power input gear and to conduct the collected lubricant toward said cutaway portion formed therein.

2. A power output shaft assembly according to claim 1, wherein said cylindrical base portion of said lubricant collecting and directing member is formed with an annular groove around a circumferential portion thereof, and an annular sealing O-ring is fitted in said annular groove.

3. A power output shaft assembly according to claim 1, wherein said lubricant collecting and directing member comprises a fixing arm extended from an end surface thereof opposite to said tubular extension, said fixing arm being adapted to be fastened to said casing portion forming said partition on the side thereof opposite to the side where the space for housing said differential mechanism is provided.

* * * * *